(12) United States Patent
Von Essen et al.

(10) Patent No.: US 11,815,674 B2
(45) Date of Patent: Nov. 14, 2023

(54) DUAL TUBE NIGHT VISION DEVICE

(71) Applicant: ACTinBlack Europe SARL, Foetz (LU)

(72) Inventors: Reimer Von Essen, Belvaux (LU);
Daniel Costa, Esch sur Alzette (LU);
João Costa, Esch sur Alzette (LU);
Andreas Opel, Kaufbeuren (DE)

(73) Assignee: Lumiworx SARL, Luxembourg (LU)

( * ) Notice: Subject to any disclaimer, the term of this patent is extended or adjusted under 35 U.S.C. 154(b) by 190 days.

(21) Appl. No.: 17/496,906

(22) Filed: Oct. 8, 2021

(65) Prior Publication Data

US 2023/0115465 A1    Apr. 13, 2023

(51) Int. Cl.
*G02B 23/18* (2006.01)
*G02B 23/12* (2006.01)

(52) U.S. Cl.
CPC ............. *G02B 23/18* (2013.01); *G02B 23/12* (2013.01)

(58) Field of Classification Search
CPC ................................ G02B 23/18; G02B 23/12
USPC ........ 359/480, 478, 362, 894, 900, 642, 600
See application file for complete search history.

(56) References Cited

U.S. PATENT DOCUMENTS

| | | | |
|---|---|---|---|
| 7,049,027 B2 | 5/2006 | Buchanan, Jr. et al. | |
| 8,269,159 B2 | 9/2012 | Filipovich et al. | |
| 9,507,120 B1 | 11/2016 | Bryant et al. | |
| 2012/0002064 A9* | 1/2012 | Filipovich | G02B 23/125 348/217.1 |
| 2012/0200918 A1 | 8/2012 | Rivkin et al. | |
| 2015/0323777 A1 | 11/2015 | Teetzel et al. | |
| 2017/0184835 A1* | 6/2017 | Teetzel | G02B 27/0149 |
| 2018/0335599 A1 | 11/2018 | McCreight | |
| 2019/0025567 A1* | 1/2019 | Lasky | A42B 3/042 |
| 2021/0127774 A1* | 5/2021 | Schroder | G02B 23/125 |

* cited by examiner

*Primary Examiner* — William R Alexander
*Assistant Examiner* — Sharrief I Broome
(74) *Attorney, Agent, or Firm* — F. Wayne Thompson, Jr.; Asgaard Patent Services, LLC (57) ABSTRACT

A dual tube night vision device comprises a pair of independently pivoting night-vision monoculars connected to a bridge member. Each night-vision monocular is attached to the bridge member by a rotating arm and comprises a pod containing an image intensifier tube. Each arm allows the attached night-vision monocular to move through a rotational travel path, between a stowed position and a deployed position. The dual tube night vision device is configured to detect when the night-vision monoculars are, individually or collectively, moved to a stowed position and then temporarily cut off power to the stowed monocular(s) to increase battery runtime. Power is automatically restored, individually or simultaneously, to the night-vision monoculars when they are rotated back to the deployed positions. The dual tube night vision device uses one or more accelerometers to detect when the night-vision monoculars, individually or collectively, are in the stowed position or the deployed position.

15 Claims, 8 Drawing Sheets

DUAL TUBE NIGHT VISION DEVICE

TECHNICAL FIELD

This disclosure relates to implementations of a dual tube night vision device. In particular, the present invention is directed to a housing assembly for the dual tube night vision device.

BACKGROUND

A binocular night vision device having a pair of independently pivoting night-vision monoculars offers several advantages. The use of two night-vision monoculars allows the eyes to create depth perception. The depth perception facilitated by a binocular night vision device increases the ease in maneuvering terrain and obstacles, as well as operating devices such as control panels and door knobs. However, using a single night-vision monocular, and stowing the other, allows for ease in transitioning between varied lighting conditions.

Binocular night vision devices are often configured to shut off stowed night-vision monoculars. However, prior art night vision devices frequently rely on magnetic switches that are prone to failure, susceptible to interference, and require a night vision device and its mounting system to be fabricated from materials capable of propagating magnetic fields to the magnetic switch.

Accordingly, it can be seen that needs exist for the dual tube night vision device disclosed herein. It is to the provision of a dual tube night vision device configured to address these needs, and others, that the present invention is primarily directed.

SUMMARY OF THE INVENTION

The dual tube night vision device comprises a pair of independently pivoting night-vision monoculars connected to a bridge member. Each night-vision monocular is attached to the bridge member by a rotating arm and comprises a pod containing an image intensifier tube, and other components (e.g., an objective lens assembly and an eyepiece lens assembly), that permit vision during low-light conditions by converting incoming visible and infrared light from a viewed scene to an intensified visible light image. Each arm allows the attached night-vision monocular to move through a rotational travel path, between a stowed position (i.e., out of the user's field of view) and a deployed position (i.e., in front of the user's eye(s)).

The dual tube night vision device is configured to detect when the night-vision monoculars are, individually or collectively, moved to a stowed position and then temporarily cut off power to the stowed monocular(s) to increase battery runtime. Power is automatically restored, individually or simultaneously, to the night-vision monoculars when they are rotated back to deployed positions.

An example dual tube night vision device comprises: a bridge member; a first arm rotatably coupled to the bridge member; a second arm rotatably coupled to the bridge member; a first night-vision monocular comprising a pod containing an image intensifier tube, the pod is coupled to a distal end of the first arm; a second night-vision monocular comprising a pod containing an image intensifier tube, the pod is coupled to a distal end of the second arm; a primary accelerometer positioned within the bridge member; a first auxiliary accelerometer positioned on the first arm; and, a second auxiliary accelerometer positioned on the second arm. The dual tube night vision device, using the primary accelerometer, is configured to determine a rotation angle for the bridge member. The dual tube night vision device is configured to simultaneously turn on and turn off both of the night-vision monoculars based on the rotation angle of the bridge member. The dual tube night vision device, using the primary accelerometer and the first auxiliary accelerometer, is configured to determine a lateral rotation angle for the first night-vision monocular. The dual tube night vision device is configured to turn on and turn off the first night-vision monocular based on the lateral rotation angle of the first night-vision monocular relative to the bridge member. The dual tube night vision device, using the primary accelerometer and the second auxiliary accelerometer, is configured to determine a lateral rotation angle for the second night-vision monocular. The dual tube night vision device is configured to turn on and turn off the second night-vision monocular based on the lateral rotation angle of the second night-vision monocular relative to the bridge member.

Another example dual tube night vision device comprises: a bridge member; a first arm rotatably coupled to the bridge member; a second arm rotatably coupled to the bridge member; a first night-vision monocular comprising a pod containing an image intensifier tube, the pod is coupled to a distal end of the first arm; a second night-vision monocular comprising a pod containing an image intensifier tube, the pod is coupled to a distal end of the second arm; a primary accelerometer positioned within the bridge member; a first auxiliary accelerometer positioned on the first arm; and, a second auxiliary accelerometer positioned on the second arm. The dual tube night vision device, using the primary accelerometer, is configured to detect when the bridge member has been rotated to a stowed position and a deployed position. The dual tube night vision device is configured to: simultaneously cut off power to both of the night-vision monoculars when the bridge member is rotated to the stowed position, and simultaneously power both of the night-vision monoculars when the bridge member is rotated to the deployed position. The dual tube night vision device, using the primary accelerometer and the first auxiliary accelerometer, is configured to detect when the first night-vision monocular has been laterally rotated to a stowed position and a deployed position. The dual tube night vision device is configured to: cut off power to the first night-vision monocular when the first night-vision monocular is laterally rotated to the stowed position, and power the first night-vision monocular when the first night-vision monocular is laterally rotated to the deployed position. The dual tube night vision device, using the primary accelerometer and the second auxiliary accelerometer, is configured to detect when the second night-vision monocular has been laterally rotated to a stowed position and a deployed position. The dual tube night vision device is configured to: cut off power to the second night-vision monocular when the second night-vision monocular is laterally rotated to the stowed position, and power the second night-vision monocular when the second night-vision monocular is laterally rotated to the deployed position.

Yet another example dual tube night vision device comprises: a bridge member; a first arm rotatably coupled to the bridge member; a second arm rotatably coupled to the bridge member; a first night-vision monocular comprising a pod containing an image intensifier tube, the pod is coupled to a distal end of the first arm; a second night-vision monocular comprising a pod containing an image intensifier tube, the pod is coupled to a distal end of the second arm; a primary accelerometer positioned within the bridge member; a first auxiliary accelerometer positioned on the first arm; and, a second auxiliary accelerometer positioned on the second arm. The dual tube night vision device, using the primary accelerometer, is configured to determine a rotation angle for the bridge member. The dual tube night vision device is configured to: simultaneously cut off power to both of the night-vision monoculars when the rotation angle of the bridge member is between 110°-130°, inclusive of 110° and 130°, and simultaneously power both of the night-vision monoculars when the rotation angle of the bridge member is 60° or less. The dual tube night vision device, using the primary accelerometer and the first auxiliary accelerometer, is configured to determine a lateral rotation angle for the first night-vision monocular. The dual tube night vision device is configured to: cut off power to the first night-vision monocular when the lateral rotation angle of the first night-vision monocular is 55° or less, relative to the bridge member, and power the first night-vision monocular when the lateral rotation angle of the first night-vision monocular is 110° or more, relative to the bridge member. The dual tube night vision device, using the primary accelerometer and the second auxiliary accelerometer, is configured to determine a lateral rotation angle for the second night-vision monocular. The dual tube night vision device is configured to: cut off power to the second night-vision monocular when the lateral rotation angle of the second night-vision monocular is 55° or less, relative to the bridge member, and power the second night-vision monocular when the lateral rotation angle of the second night-vision monocular is 110° or more, relative to the bridge member.

BRIEF DESCRIPTION OF THE DRAWINGS

Like reference numerals refer to corresponding parts throughout the several views of the drawings.

DETAILED DESCRIPTION

FIGS. 1-5 illustrate an example dual tube night vision device 100. The dual tube night vision device 100 comprises a pair of independently pivoting night-vision monoculars 110a, 110b connected to a bridge member 112. Each night-vision monocular 110a, 110b is attached to the bridge member 112 by a rotating arm 114a, 114b and comprises a pod 116 containing an image intensifier tube (152a, 152b), and other components (e.g., an objective lens assembly 120 and an eyepiece lens assembly 122), that permit vision during low-light conditions by converting incoming visible and infrared light from a viewed scene to an intensified visible light image. Each arm 114a, 114b allows the attached night-vision monocular 110a, 110b to move through a rotational travel path, between a stowed position (i.e., out of the user's field of view) and a deployed position (i.e., in front of the user's eye(s)). The bridge member 112 includes a mounting shoe 118 used to attach the dual tube night vision device 100 to a helmet mount 102, for example, a dovetail mount such as the Wilcox L4 G24 mount.

As shown in FIGS. 1-5, the housing assembly 108 of the dual tube night vision device 100 comprises the bridge member 112, the arms 114, and the pod 116 of each night-vision monocular 110a, 110b. The housing assembly 108 includes a power switch 124 and an infrared illuminator 126. The housing assembly 108 holds a power source (i.e., a battery 150) in a battery compartment 128, and the power supply circuitry (not shown) needed to operate the infrared illuminator 126, the image intensifier tube (152a or 152b) within each night-vision monocular 110a, 110b, and other electrical components described herein.

Figure 1:
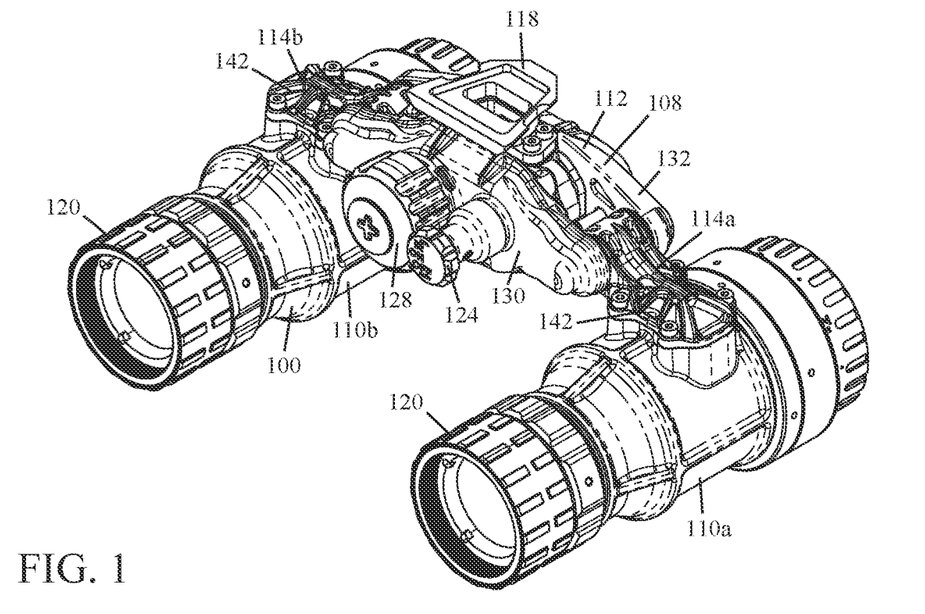
FIG. 1 illustrate a top, front, left side isometric view of a dual tube night vision device according to the principles of the present disclosure.
Figure 2:
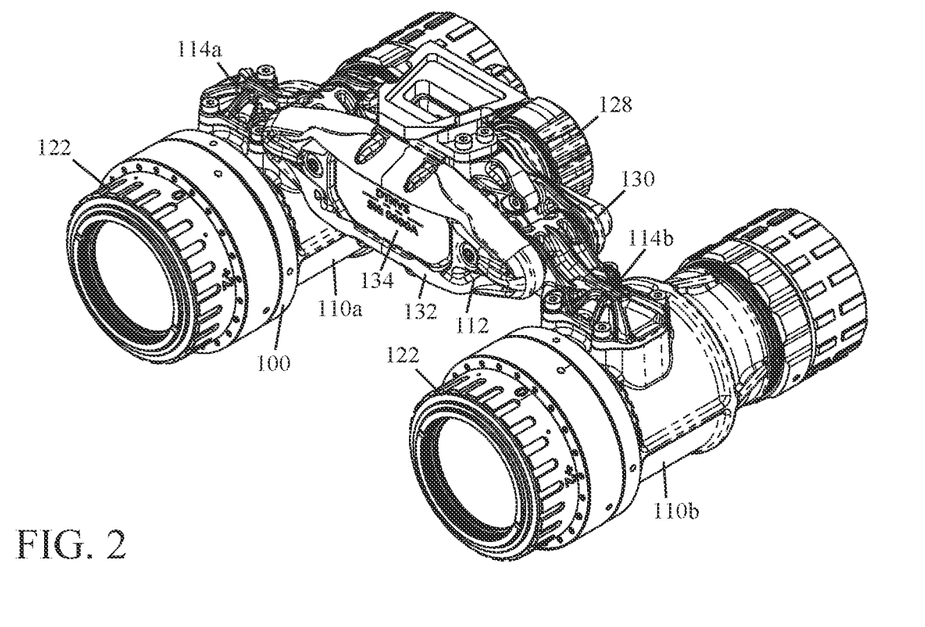
FIG. 2 illustrates a top, rear, right side isometric view of the dual tube night vision device shown in FIG. 1.
Figure 3:
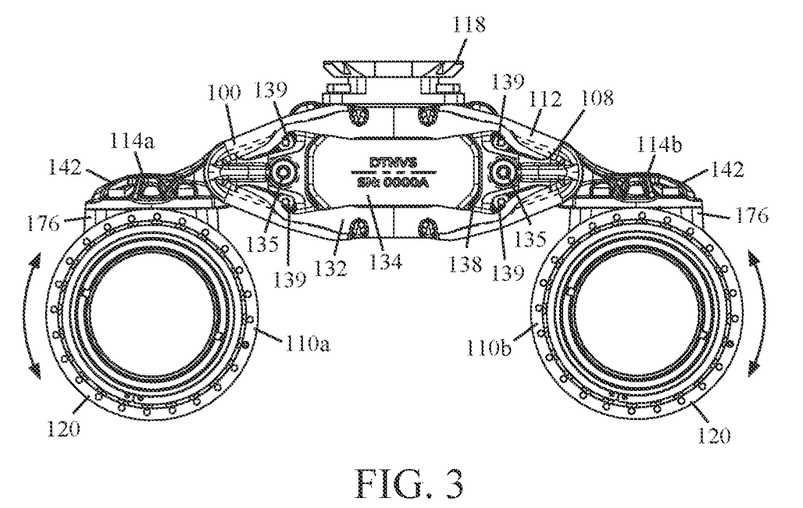
FIG. 3 illustrates a rear side elevational view of the dual tube night vision device shown in FIG. 1.
Figure 4:
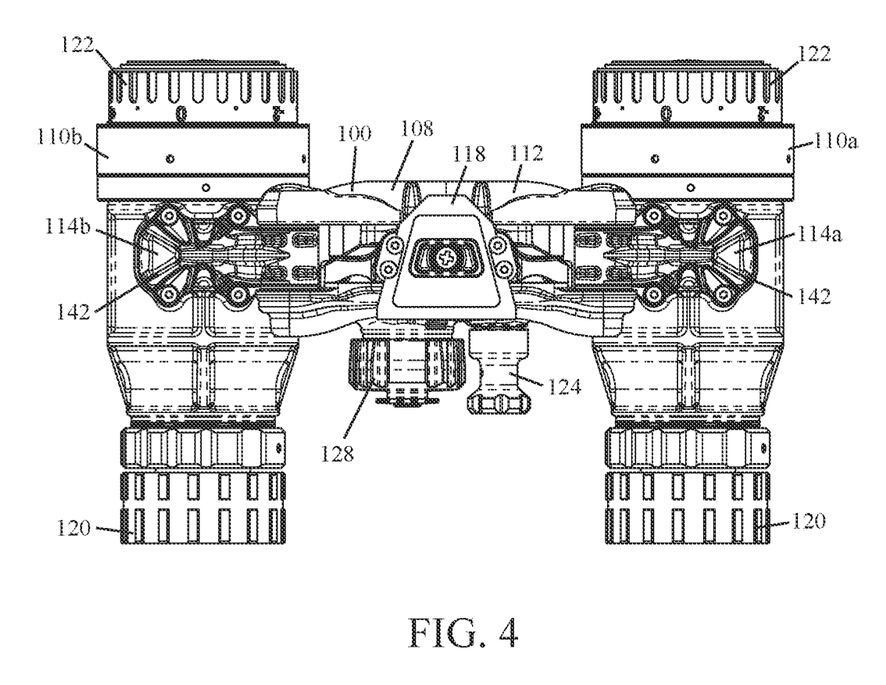
FIG. 4 illustrates a top plan view of the dual tube night vision device shown in FIG. 1.
Figure 5:
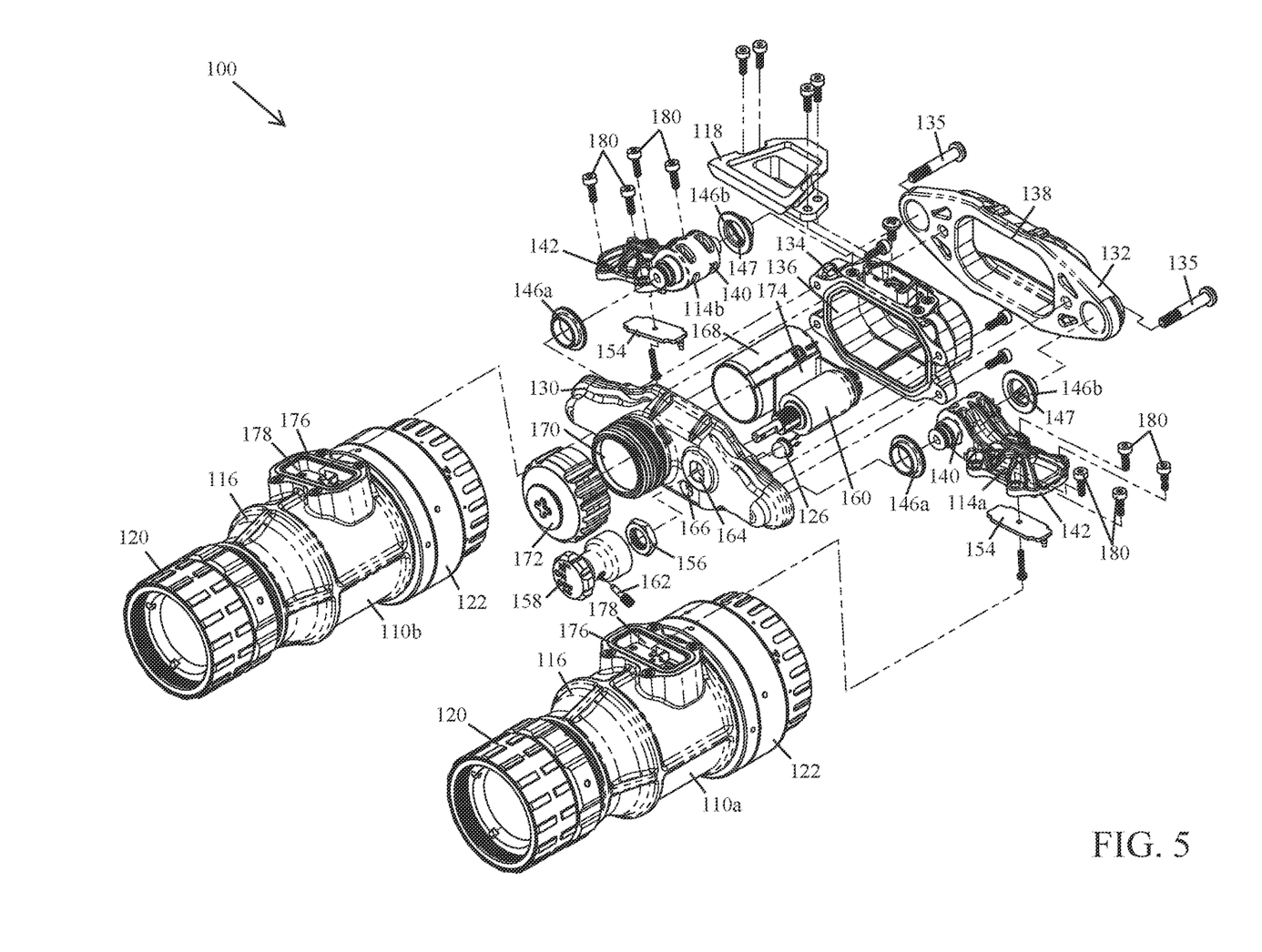
FIG. 5 illustrates an exploded view of the housing assembly of the dual tube night vision device shown in FIG. 1.
Figure 6:
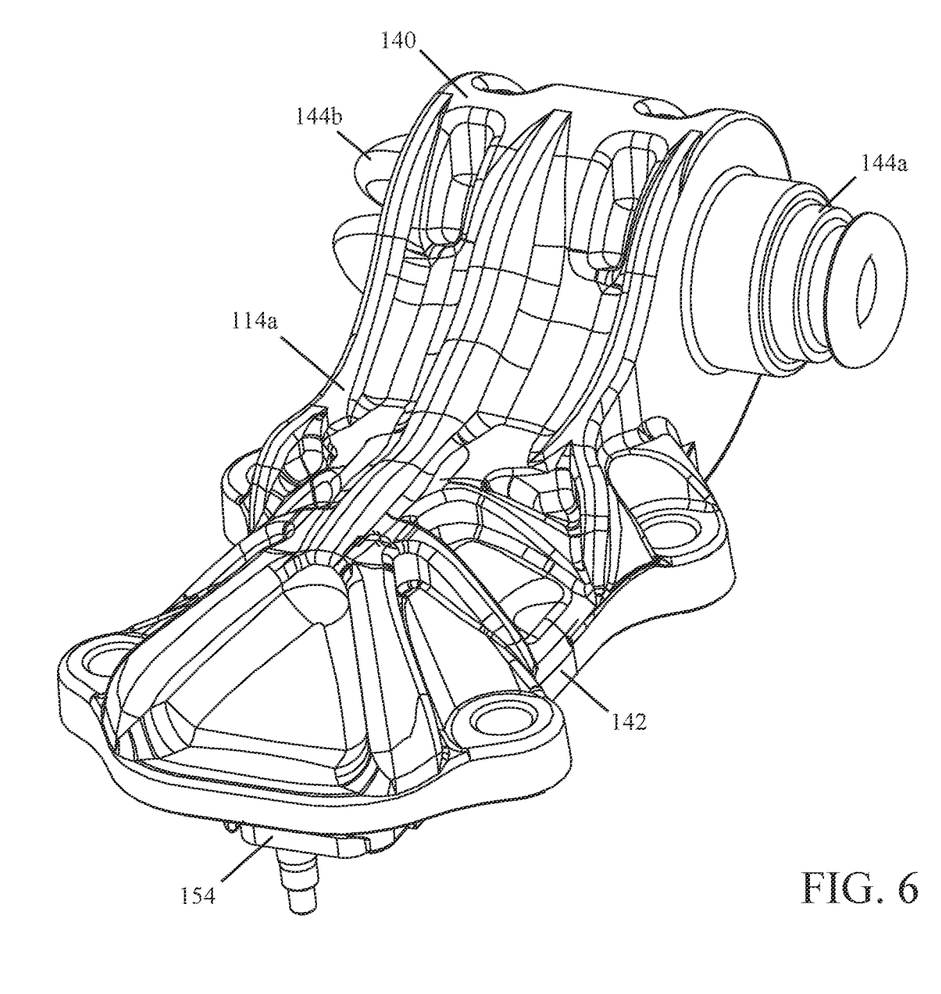
FIGS. 6 and 7 illustrate an example arm of the dual tube night vision device shown in FIG. 1.

As shown best in FIG. 5, the bridge member 112 of the housing assembly 108 comprises a front plate 130, a back plate 132, and a middle housing 134 captured between them. The middle housing 134 defines an interior compartment 136 and is secured to a back side of the front plate 130 by threaded fasteners 139 (see, e.g., FIG. 3). The back plate 132 includes an aperture 138 configured to receive, and support, a rear portion of the middle housing 134. The back plate 132 is secured to the back side of the front plate 130 by threaded fasteners 135, thereby capturing the middle housing 134 between the front plate 130 and the back plate 132.

Figure 7:
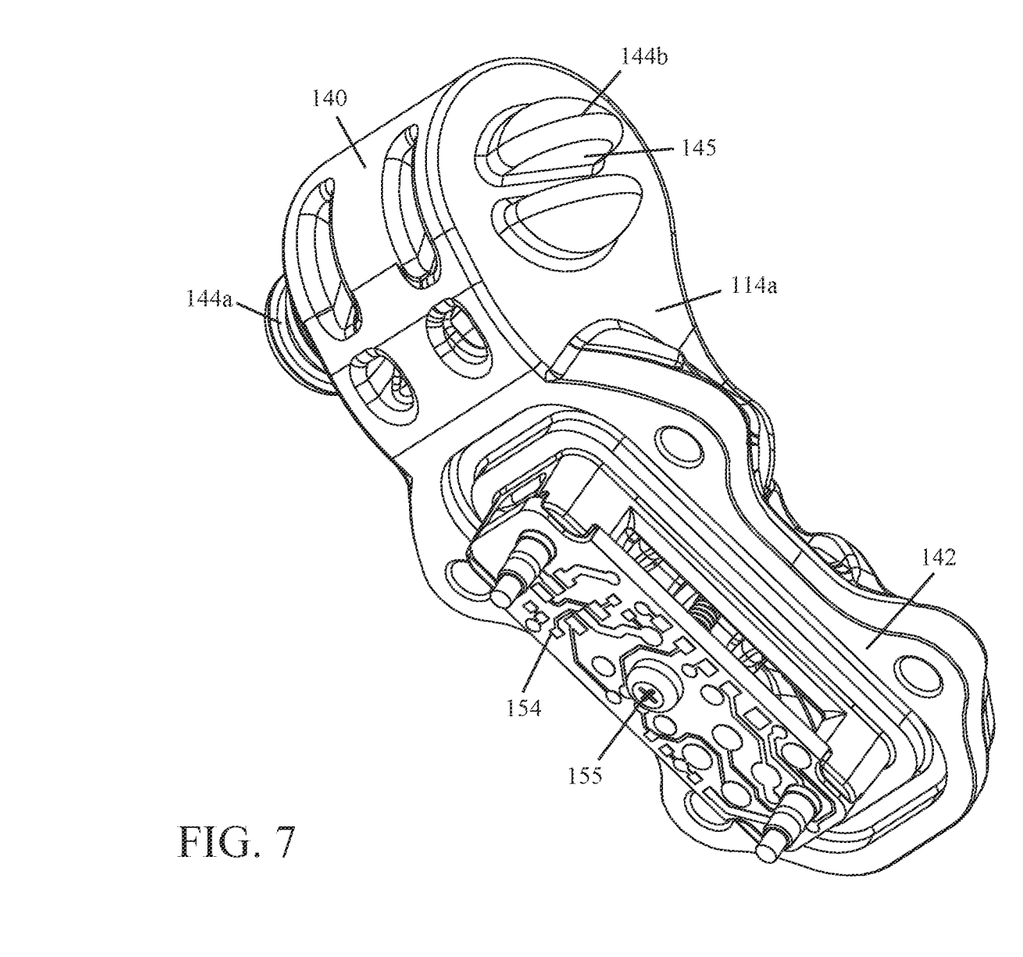

Each arm 114a, 114b of the housing assembly 108 comprises a proximal end 140 rotatably captured between the front plate 130 and back plate 132 of the bridge member 112, and a distal end 142 adapted for attachment to the pod 116 of a night-vision monocular 110a, 110b. The threaded fasteners 135, used to attach the front plate 130 to the back plate 132, are used to adjust (i.e., increase or decrease) the tension placed by the bridge member 112 on the proximal end 140 of each arm 114a, 114b. The proximal end 140 of each arm 114a, 114b comprises two pivots 144a, 144b located opposite each other. A flange bearing 146a, 146b (e.g., fabricated of fiber reinforced plastic) is fitted on each pivot 144a, 144b. Each flange bearing 146a, 146b is rotatably positioned within a circular opening in either the front plate 130 or the back plate 132 of the housing assembly 108. The front flange bearing 146a includes a central opening configured to receive therein the front pivot 144a of an arm 114a, 114b; the rear flange bearing 146b includes a crossbeam 147 extending across a central opening configured to receive therein the rear pivot 144b of an arm 114a, 114b. The rear pivot 144b of each arm 114a, 114b is a bifurcated structure, including two lobes separated by a gap 145 configured to receive therein the crossbeam 147 of a rear flange bearing 146b. In this way, rotation of the rear flange bearing 146b is tied to rotation of the arm 114a, 114b. The distal end 142 of each arm 114a, 114b includes an accelerometer 148. The accelerometer 148 is mounted on a printed circuit board (PCB) 154 secured to the underside of the distal end 142 by a threaded fastener 155 (see, e.g., FIG. 7). However, it should be understood that the accelerometer 148 could be positioned anywhere on an arm 114a, 114b and still perform the functions described herein. In some implementations, a microprocessor 186, device specific circuits required to perform the task described below, or a combination thereof are mounted on the PCB 154 attached to the distal end of each arm 114a, 114b.

Each pod 116 of the housing assembly 108 includes an attachment interface 176 to which the distal end 142 of an arm 114a, 114b is attached using fasteners, such as threaded fasteners 180. Each attachment interface 176 extends from a top side of the pod and includes an opening 178 configured to receive therein the PCB 154 secured to the distal end 142 of the arm 114a, 114b.

The power switch 124 of the housing assembly 108 is secured to the front plate 130 of the bridge member 112 by a locking nut 156 and comprises a switch knob 158 and a rotary switch module 160 having a spindle. The rotary switch module 160 is positioned within the interior compartment 136 of the middle housing 134 and covered by the front plate 130. The spindle of the rotary switch module 160 extends through an aperture 164 in the front plate 130 and the switch knob 158 is secured to the spindle by a locking pin 162. While the preferred implementation of the power switch 124 includes a rotary switch module 160, it should be understood that other power switch designs suitable for performing, at least, the functions described herein could also be used.

As shown best in FIG. 5, the front plate 130 also includes an aperture 166 for the infrared illuminator 126. The infrared illuminator 126 produces a beam of near infrared light that is detectable by the image intensifier tube 152a, 152b within each night-vision monocular 110a, 110b. The infrared illuminator 126 is activated by the power switch 124 on the front side of bridge member 112.

As shown best in FIG. 5, the battery compartment 128 comprises a cylindrical housing 168 including the externally threaded extension 170 of the front plate 130, and a battery housing cap 172. The cylindrical housing 168 is positioned within the externally threaded extension 170 of the front plate 130 and the interior compartment 136 of the middle housing 134. The battery housing cap 172 is adapted to mate with the threaded extension 170 of the front plate 130.

As shown best in FIG. 5, the interior compartment 136 of the bridge member 112 also houses a printed circuit board (PCB) 174. The PCB 174 is positioned between the rotary switch module 160 of the power switch 124 and the cylindrical housing 168 of the battery compartment 128. However, in some implementations, the PCB 174 could be positioned elsewhere within the interior compartment 136 of the bridge member 112. An accelerometer 182 and a microprocessor 184 are mounted on the PCB 174. In some implementations, other device specific circuits required to perform the tasks described below are also mounted on the PCB 174.

Operation and Use

Figure 9:
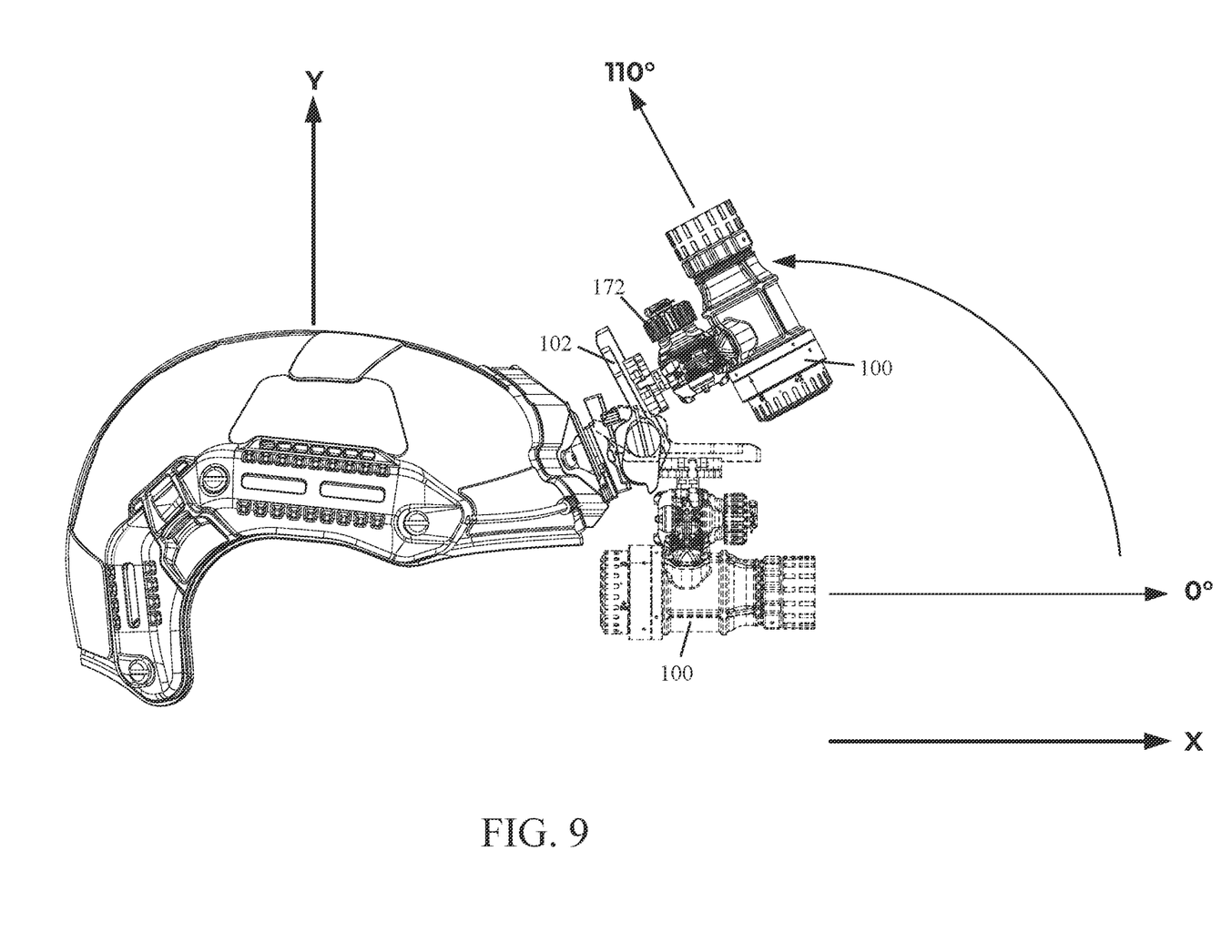
FIG. 9 illustrates a side view of the dual tube night vision device shown in FIG. 1, wherein the deployed position of the dual tube night vision device is illustrated in broken lines. The dual tube night vision device is attached to a helmet.
Figure 10:
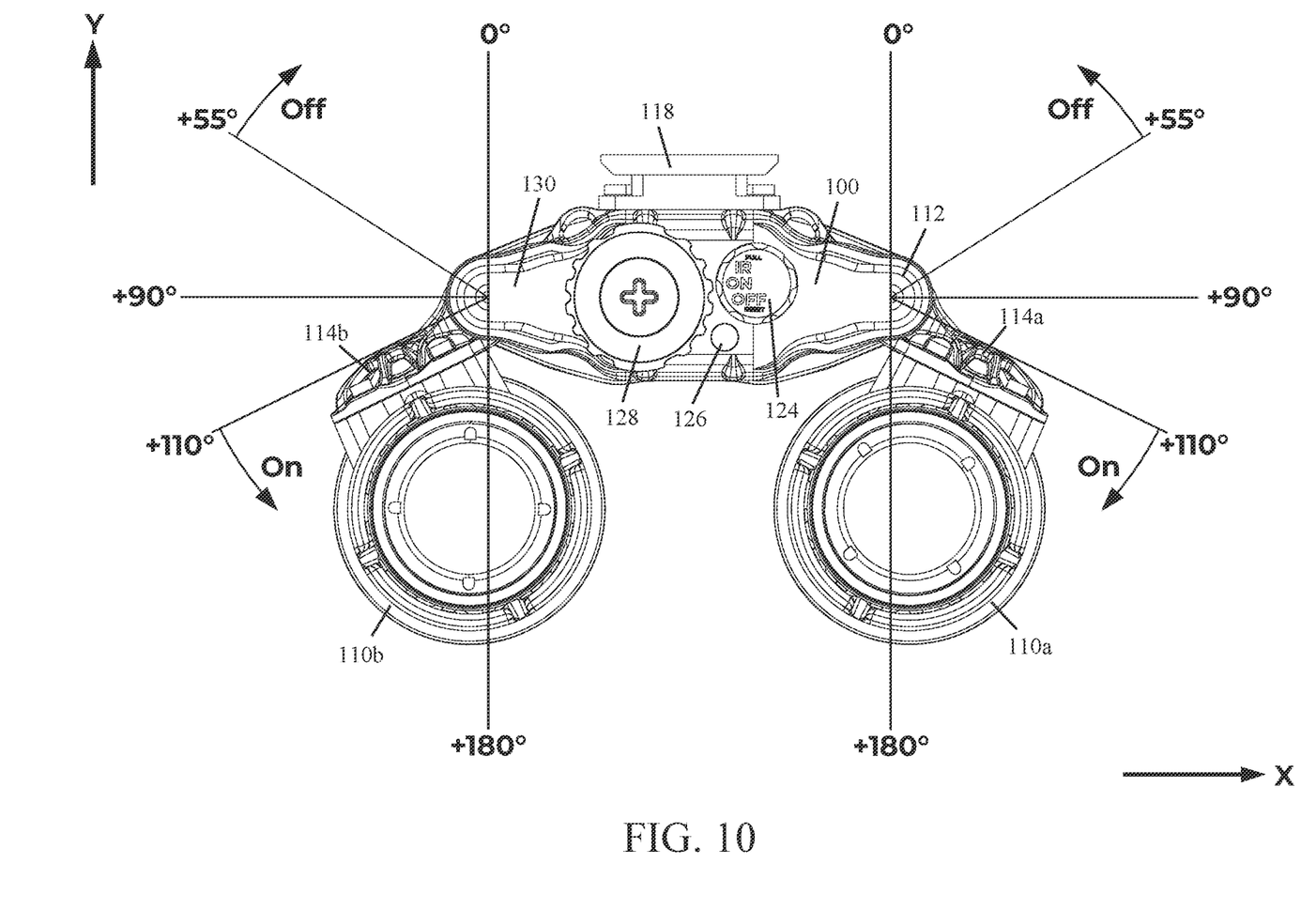
FIG. 10 illustrate a front view of the dual tube night vision device shown in FIG. 1, wherein an example range of lateral rotation angles that result in each night-vision monocular being turned on or turned off are shown.

The housing assembly 108 of the dual tube night vision device 100 is configured to simultaneously turn on (i.e., power) or turn off (i.e., cut off power) both night-vision monoculars 110a, 110b based on the rotation angle of the bridge member 112 (see, e.g., FIG. 9). The housing assembly 108 is also configured to individually turn on or turn off each night-vision monocular 110a, 110b based on its lateral rotation angle relative to the bridge member 112 (see, e.g., FIG. 10).

To increase battery runtime, the housing assembly 108 is configured to detect when the night-vision monoculars 110a, 110b are in a stowed position and cut off power, simultaneously or individually, to the night-vision monoculars 110a, 110b of the dual tube night vision device 100. As discussed below, the housing assembly 108 uses one or more accelerometers (148, 182) to detect when the night-vision monoculars 110a, 110b, collectively or individually, have been rotated to a stowed position.

When the dual tube night vision device 100 is flipped up (i.e., rotated to a stowed position as shown in FIG. 9), the housing assembly 108 is configured to simultaneously cut off power to both night-vision monoculars 110a, 110b. To perform this task, the primary accelerometer 182, located in the bridge member 112, works in conjunction with a microprocessor 184, and other device specific circuits (e.g., a power switch), to determine the rotation angle of the bridge member 112 and cut off power to both night-vision monoculars 110a, 110b if the rotation angle is between 110°-130°, inclusive of 110° and 130°. This range of angle measures, 110°-130°, was not arbitrarily selected. Since not all angles are equally comfortable for a human to hold their head and look, for example straight ahead (i.e., at a 0° angle) versus straight up at the sky (i.e., at a 90° angle), it is unlikely that a human wearing the dual tube night vision device 100 would rotate their head backwards to an angle of 110°, or more.

Figure 8:
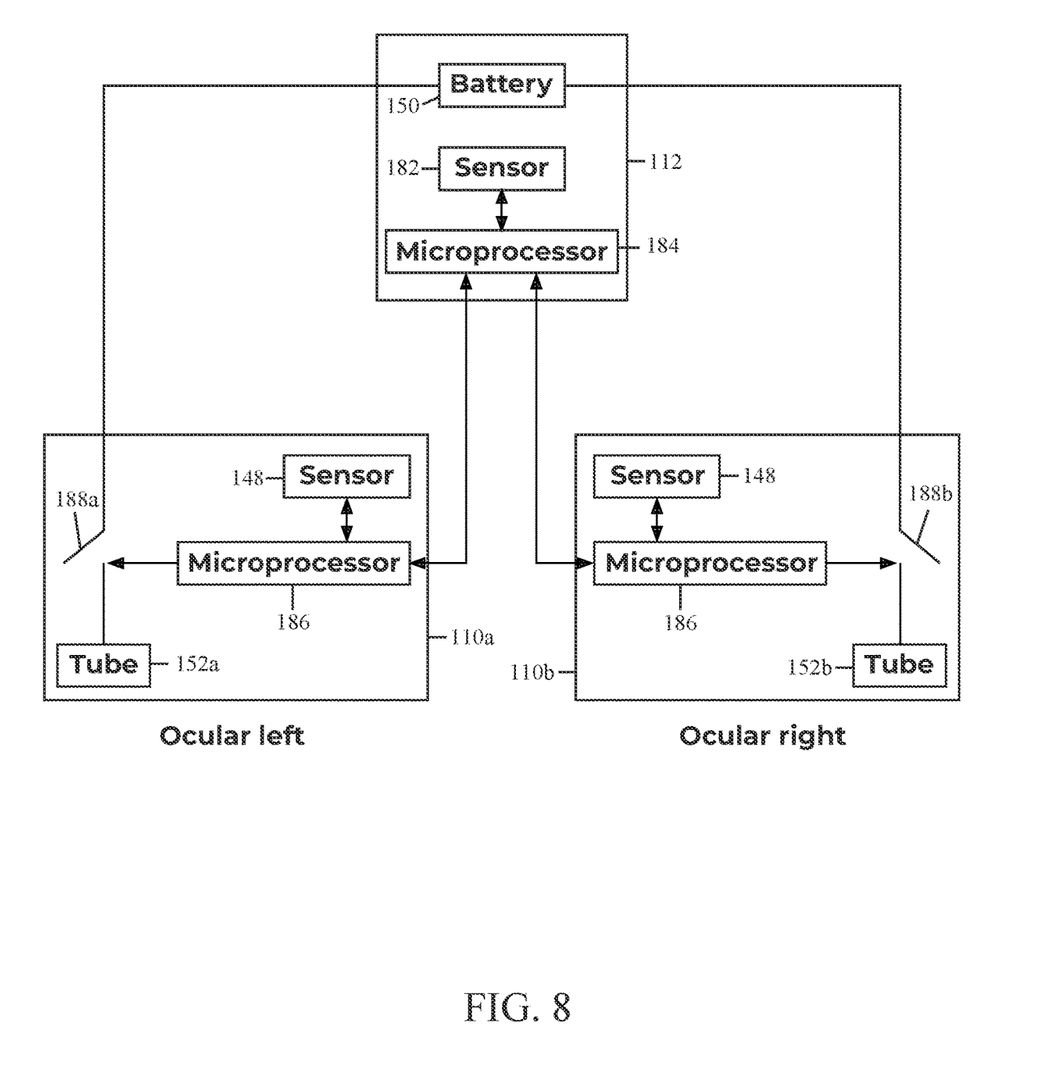
FIG. 8 illustrates a schematic view of an example electronic circuit for the accelerometers of the dual tube night vision device shown in FIG. 1.

When either night-vision monocular (110a or 110b) is laterally rotated to a stowed position, the housing assembly 108 is configured to cut off power to the stowed night-vision monocular 110a, 110b. This can also be referred to as individual channel cutoff. To perform this task, the primary accelerometer 182, located in the bridge member 112, works in conjunction with the auxiliary accelerometer 148 on an arm 114a, 114b to determine the lateral rotation angle of the attached night-vision monocular 110a, 110b relative to the bridge member 112. Further, the primary accelerometer 182 and auxiliary accelerometer 148 each work in conjunction with a microprocessor 184, 186, and other device specific circuits (e.g., a power switch 188a, 188b), to determine the lateral rotation angle and cut off power to the night-vision monocular 110a, 110b if the lateral rotation angle is at least 55°, or less, relative to the bridge member 112 (see, e.g., FIGS. 8 and 10). Though, in some implementations, the housing assembly 108 could be configured to cut off power to the night-vision monocular 110a, 110b when the lateral rotation angle is 65°, or less, relative to the bridge member 112. To distribute calculation workload evenly between microprocessors 184, 186, the primary microprocessor 184 sends data from the primary accelerometer 182 to the microprocessor 186 on the arm 114a, 114b to which the relevant monocular night-vision device 110a, 110b is attached. This allows the microprocessor 186 on each arm 114a, 114b to calculate the lateral rotation angle relative to the bridge member 112 and cut off power to the attached night-vision monocular 110a, 110b when it has been laterally rotated to an angle of 55°, or less.

The housing assembly 108 is also configured to detect when the night-vision monoculars 110a, 110b are in a deployed position and power, simultaneously or individually, the night-vision monoculars 110a, 110b of the dual tube night vision device 100. As discussed below, the housing assembly 108 uses one or more accelerometers (148, 182) to detect when the night-vision monoculars 110a, 110b, collectively or individually, have been rotated to a deployed position.

When the dual tube night vision device 100 is flipped down (i.e., rotated to a deployed position as shown in FIG. 9), the housing assembly 108 is configured to simultaneously power both night-vision monoculars 110a, 110b. To perform this task, the primary accelerometer 182, located in the bridge member 112, works in conjunction with a microprocessor 184, and other device specific circuits (e.g., a power switch), to determine the rotation angle of the bridge member 112 and power both night-vision monoculars 110a, 110b when the rotation angle is 60°, or less.

When either night-vision monocular (110a or 110b) is laterally rotated to a deployed position, the housing assembly 108 is configured to power the deployed night-vision monocular 110a, 110b. To perform this task, the primary accelerometer 182, located in the bridge member 112, works in conjunction with the auxiliary accelerometer 148 on an arm 114a, 114b to determine the lateral rotation angle of the attached night-vision monocular 110a, 110b relative to the bridge member 112. Further, the primary accelerometer 182 and auxiliary accelerometer 148 each work in conjunction with a microprocessor 184, 186, and other device specific circuits (e.g., a power switch 188a, 188b), to determine the lateral rotation angle and power the night-vision monocular 110a, 110b if the lateral rotation angle is 110°, or more, relative to the bridge member 112 (see, e.g., FIGS. 8 and 10). To distribute calculation workload evenly between microprocessors 184, 186, the primary microprocessor 184 sends data from the primary accelerometer 182 to the microprocessor 186 on the arm 114a, 114b to which the relevant monocular night-vision device 110a, 110b is attached. This allows the microprocessor 186 on each arm 114a, 114b to calculate the lateral rotation angle relative to the bridge member 112 and power the attached night-vision monocular 110a, 110b when it has been laterally rotated to an angle of 110°, or more.

However, it should be understood that the housing assembly 108 cannot power the night-vision monoculars 110a, 110b, regardless of rotation angle or lateral rotation angle, unless the main power switch 124 is in the ON position.

Prior art solutions to detect rotation of night vision devices, relative to a helmet or head harness to which they are mounted, use unreliable magnetic switches (e.g., a magnetic reed switch). Magnetic switches are prone to failure, susceptible to interference, and require a night vision device and its mounting system to be fabricated from materials capable of propagating magnetic fields to the magnetic switch. These short-comings are eliminated by the use of accelerometers as described herein. Accelerometers 148, 182 are an ideal solution for detecting the rotation angle of the binocular night vision device 100 and the lateral rotation angle of each night-vision monocular 110a, 110b.

Parts of the housing assembly 108 (i.e., the bridge member 112, the arms 114, and the pod 116 of each night-vision monocular 110a, 110b) are made of injection-molded carbon fiber reinforced nylon 66 (e.g., 20% carbon fiber reinforced PA 66). This provides for a housing assembly 108 that is light weight, without sacrificing durability or ruggedness. In fact, the housing assembly 108 exceeds MIL-STD-810G test protocols for drop and impact by a factor of two. The battery compartment 128 is made of an electrically inert polyethylene plastic (PEP) material. Fabricating the battery compartment 128 from an electrically inert material allows for a housing assembly 108 made of an electrically conductive material, such as carbon fiber reinforced nylon 66.

Although not shown in the drawings, it will be understood that suitable wiring, traces, or a combination thereof, connect the electrical components of the dual tube night vision device 100 disclosed herein (e.g., the battery 150, infrared illuminator 126, image intensifier tubes (152a, 152b), accelerometers (148, 182), microprocessors (184, 186), etc.).

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A dual tube night vision device comprising:
a bridge member;
a first arm rotatably coupled to the bridge member;
a second arm rotatably coupled to the bridge member;
a first night-vision monocular comprising a pod containing an image intensifier tube, the pod is coupled to a distal end of the first arm;
a second night-vision monocular comprising a pod containing an image intensifier tube, the pod is coupled to a distal end of the second arm;
a primary accelerometer positioned within the bridge member;
a first auxiliary accelerometer positioned on the first arm; and
a second auxiliary accelerometer positioned on the second arm;
wherein the dual tube night vision device, using the primary accelerometer, is configured to determine a rotation angle for the bridge member;
wherein the dual tube night vision device is configured to simultaneously turn on and turn off both of the night-vision monoculars based on the rotation angle of the bridge member;
wherein the dual tube night vision device, using the primary accelerometer and the first auxiliary accelerometer, is configured to determine a lateral rotation angle for the first night-vision monocular;
wherein the dual tube night vision device is configured to turn on and turn off the first night-vision monocular based on the lateral rotation angle of the first night-vision monocular relative to the bridge member;
wherein the dual tube night vision device, using the primary accelerometer and the second auxiliary accelerometer, is configured to determine a lateral rotation angle for the second night-vision monocular;
wherein the dual tube night vision device is configured to turn on and turn off the second night-vision monocular based on the lateral rotation angle of the second night-vision monocular relative to the bridge member.

2. The dual tube night vision device of claim 1, wherein the bridge member comprises a front plate, a back plate, and a middle housing positioned between the front plate and the back plate, the middle housing defines an interior compartment and is attached to a backside of the front plate, the back plate is attached to the back side of the front plate.

3. The dual tube night vision device of claim 2, wherein a proximal end of the first arm is rotatably captured between the front plate and the back plate of the bridge member; a proximal end of the second arm is rotatably captured between the front plate and the back plate of the bridge member.

4. The dual tube night vision device of claim 3, wherein the back plate is attached to the back side of the front plate by two threaded fasteners used to adjust tension placed on the proximal end of each of the arms by the front plate and the back plate.

5. The dual tube night vision device of claim 1, wherein the pod of the first night-vision monocular includes an attachment interface to which the distal end of the first arm is coupled, the attachment interface extends from a top side of the pod and includes an opening configured to receive therein the first auxiliary accelerometer positioned on the distal end of the first arm; the pod of the second night-vision monocular includes an attachment interface to which the distal end of the second arm is coupled, the attachment interface extends from a top side of the pod and includes an opening configured to receive therein the second auxiliary accelerometer positioned on the distal end of the second arm.

6. A dual tube night vision device comprising:
a bridge member;
a first arm rotatably coupled to the bridge member;
a second arm rotatably coupled to the bridge member;
a first night-vision monocular comprising a pod containing an image intensifier tube, the pod is coupled to a distal end of the first arm;
a second night-vision monocular comprising a pod containing an image intensifier tube, the pod is coupled to a distal end of the second arm;
a primary accelerometer positioned within the bridge member;
a first auxiliary accelerometer positioned on the first arm; and
a second auxiliary accelerometer positioned on the second arm;
wherein the dual tube night vision device, using the primary accelerometer, is configured to detect when the bridge member has been rotated to a stowed position and a deployed position;
wherein the dual tube night vision device is configured to: simultaneously cut off power to both of the night-vision monoculars when the bridge member is rotated to the stowed position, and simultaneously power both of the night-vision monoculars when the bridge member is rotated to the deployed position;
wherein the dual tube night vision device, using the primary accelerometer and the first auxiliary accelerometer, is configured to detect when the first night-vision monocular has been laterally rotated to a stowed position and a deployed position;
wherein the dual tube night vision device is configured to: cut off power to the first night-vision monocular when the first night-vision monocular is laterally rotated to the stowed position, and power the first night-vision monocular when the first night-vision monocular is laterally rotated to the deployed position;
wherein the dual tube night vision device, using the primary accelerometer and the second auxiliary accelerometer, is configured to detect when the second night-vision monocular has been laterally rotated to a stowed position and a deployed position;
wherein the dual tube night vision device is configured to: cut off power to the second night-vision monocular when the second night-vision monocular is laterally rotated to the stowed position, and power the second night-vision monocular when the second night-vision monocular is laterally rotated to the deployed position.

7. The dual tube night vision device of claim 6, wherein the bridge member comprises a front plate, a back plate, and a middle housing positioned between the front plate and the back plate, the middle housing defines an interior compartment and is attached to a backside of the front plate, the back plate is attached to the back side of the front plate.

8. The dual tube night vision device of claim 7, wherein a proximal end of the first arm is rotatably captured between the front plate and the back plate of the bridge member; a proximal end of the second arm is rotatably captured between the front plate and the back plate of the bridge member.

9. The dual tube night vision device of claim 8, wherein the back plate is attached to the back side of the front plate by two threaded fasteners used to adjust tension placed on the proximal end of each of the arms by the front plate and the back plate.

10. The dual tube night vision device of claim 6, wherein the pod of the first night-vision monocular includes an attachment interface to which the distal end of the first arm is coupled, the attachment interface extends from a top side of the pod and includes an opening configured to receive therein the first auxiliary accelerometer positioned on the distal end of the first arm; the pod of the second night-vision monocular includes an attachment interface to which the distal end of the second arm is coupled, the attachment interface extends from a top side of the pod and includes an opening configured to receive therein the second auxiliary accelerometer positioned on the distal end of the second arm.

11. A dual tube night vision device comprising:
a bridge member;
a first arm rotatably coupled to the bridge member;
a second arm rotatably coupled to the bridge member;
a first night-vision monocular comprising a pod containing an image intensifier tube, the pod is coupled to a distal end of the first arm;
a second night-vision monocular comprising a pod containing an image intensifier tube, the pod is coupled to a distal end of the second arm;
a primary accelerometer positioned within the bridge member;
a first auxiliary accelerometer positioned on the first arm; and
a second auxiliary accelerometer positioned on the second arm;
wherein the dual tube night vision device, using the primary accelerometer, is configured to determine a rotation angle for the bridge member;
wherein the dual tube night vision device is configured to: simultaneously cut off power to both of the night-vision monoculars when the rotation angle of the bridge member is between 110°-130°, inclusive of 110° and 130°, and simultaneously power both of the night-vision monoculars when the rotation angle of the bridge member is 60° or less;

wherein the dual tube night vision device, using the primary accelerometer and the first auxiliary accelerometer, is configured to determine a lateral rotation angle for the first night-vision monocular;

wherein the dual tube night vision device is configured to: cut off power to the first night-vision monocular when the lateral rotation angle of the first night-vision monocular is 55°, or less, relative to the bridge member, and power the first night-vision monocular when the lateral rotation angle of the first night-vision monocular is 110°, or more, relative to the bridge member;

wherein the dual tube night vision device, using the primary accelerometer and the second auxiliary accelerometer, is configured to determine a lateral rotation angle for the second night-vision monocular;

wherein the dual tube night vision device is configured to: cut off power to the second night-vision monocular when the lateral rotation angle of the second night-vision monocular is 55°, or less, relative to the bridge member, and power the second night-vision monocular when the lateral rotation angle of the second night-vision monocular is 110°, or more, relative to the bridge member.

12. The dual tube night vision device of claim 11, wherein the bridge member comprises a front plate, a back plate, and a middle housing positioned between the front plate and the back plate, the middle housing defines an interior compartment and is attached to a backside of the front plate, the back plate is attached to the back side of the front plate.

13. The dual tube night vision device of claim 12, wherein a proximal end of the first arm is rotatably captured between the front plate and the back plate of the bridge member; a proximal end of the second arm is rotatably captured between the front plate and the back plate of the bridge member.

14. The dual tube night vision device of claim 13, wherein the back plate is attached to the back side of the front plate by two threaded fasteners used to adjust tension placed on the proximal end of each of the arms by the front plate and the back plate.

15. The dual tube night vision device of claim 11, wherein the pod of the first night-vision monocular includes an attachment interface to which the distal end of the first arm is coupled, the attachment interface extends from a top side of the pod and includes an opening configured to receive therein the first auxiliary accelerometer positioned on the distal end of the first arm; the pod of the second night-vision monocular includes an attachment interface to which the distal end of the second arm is coupled, the attachment interface extends from a top side of the pod and includes an opening configured to receive therein the second auxiliary accelerometer positioned on the distal end of the second arm.

* * * * *